(12) United States Patent
Carter (10) Patent No.: US 6,208,336 B1
(45) Date of Patent: *Mar. 27, 2001

(54) DYNAMIC GRAPHICAL USER INTERFACE FEATURE-SET CONFIGURATION

(75) Inventor: Kapono D. Carter, San Jose, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,918

(22) Filed: Mar. 20, 1998

(51) Int. Cl.$^7$ ............................................. G06F 3/00
(52) U.S. Cl. .................. 345/333; 345/335; 345/339; 709/328; 717/11
(58) Field of Search ....................... 345/335, 333, 345/339; 395/712; 709/302, 303

(56) References Cited

U.S. PATENT DOCUMENTS

| | | | |
|---|---|---|---|
| 5,327,529 | * 7/1994 | Fults et al. | 345/335 |
| 5,404,441 | * 4/1995 | Satoyama | 345/334 |
| 5,437,025 | * 7/1995 | Bale et al. | 707/103 |
| 5,659,751 | 8/1997 | Heninger | 395/685 |
| 5,767,849 | * 6/1998 | Borgendale et al. | 345/335 |
| 5,786,815 | * 7/1998 | Ford | 345/333 |
| 5,901,313 | * 5/1999 | Wolf et al. | 345/335 |

OTHER PUBLICATIONS

Jaworski, "Java 1.1 Developer's Guide," 2nd Ed., 1997, Sams.net Publishing.
T. Lindholm et al., "The Java Virtual Machine Specification," Addison Wesley, 1996.
R. Jones et al., "Garbage Collection, Algorithms For Automatic Dynamic Memory Management," 1996.

\* cited by examiner

Primary Examiner—Raymond J. Bayerl
Assistant Examiner—Cuong T. Thai
(74) Attorney, Agent, or Firm—Finnegan, Henderson, Farabow, Garrett & Dunner, L.L.P.

(57) ABSTRACT

A system dynamically constructs a graphical user interface associated with an application. A command class library stores command classes that represent additional functions to be integrated with the application. An execution unit attempts to instantiate the command classes at run-time of the application, determines which of the command classes were instantiated successfully, and constructs the graphical user interface for the application such that the graphical user interface contains the additional functions of the successfully instantiated command classes.

24 Claims, 9 Drawing Sheets

DYNAMIC GRAPHICAL USER INTERFACE FEATURE-SET CONFIGURATION

BACKGROUND OF THE INVENTION

The present invention is directed to software programming systems and, more particularly, to systems and methods that dynamically reconfigure a graphical user interface associated with an application based on the additional features available at run-time.

Software developers have realized the advantages of using modular concepts in the design of computer program logic. Software built using modular concepts are more portable to other hardware platforms, more compatible with other software and hardware interfaces, and tend to be more easily designed, tested, installed, and maintained. Software developers design the program logic as groups of separate software modules (components) that perform specialized tasks. The developers design each module to be as independent and abstract as possible from other modules.

Object-oriented programming promotes modular software design. Object-oriented programming allows the software developer to associate a packet of information with a set of methods (or functions) for manipulating the information. The information packet with its associated methods is collectively called an object. By accessing a particular object, the developer gains implicit access to the object's associated methods.

Object-oriented systems make a distinction between the description of an object and the object itself. More than one similar object may be described by the same general description. The object description is called a class because the description can be used to describe a type or "class" of similar objects. In other words, an object is an instance of a class. An example of an object-oriented programming language using objects and classes is Sun Microsystems™ Java™ object-oriented programming language described in a text entitled "Java 1.1 Developer's Guide," 2nd ed., 1997 by Sams.net Publishing, Jamie Jaworski, Ed., which is hereby incorporated by reference. Sun, Sun Microsystems, the Sun logo, Java, and Java-based trademarks are trademarks or registered trademarks of Sun Microsystems Inc. in the United States and other countries.

Software developers conventionally provide to a customer all classes required by an application for run-time operation. However, an application may require classes that are not present at run-time. Consider, for example, a mail application that is integrated with a calendar module. The calendar module provides additional functions to the mail application, such as permitting the scheduling of appointments and events. The graphical user interface for the mail application might contain a schedule appointment button for invoking the appointment scheduling functions. A schedule appointment button would be useless. however, if the calendar classes are not available.

Software developers address this problem by creating two separate versions of the mail application: one integrated with the calendar, and one without it. This way, the software developers can meet the customers' needs by providing only those additional functions that the customers desire.

A problem with this solution is that it requires the software developer to create many versions of the same application with varying degrees of additional functionality, as desired by the customers. Otherwise, the software developer might create only a single version integrating all of the additional functionality. This, however, would increase the cost of software production and force customers that desire only the basic application to purchase the additional functionality.

Therefore, a need exists for providing customers with an application having only the desired functionality without requiring the creation of several versions of the application.

SUMMARY OF THE INVENTION

Systems and methods consistent with the present invention address this need by moving the additional functionality to separate classes or modules that may be sold separate from the basic application, determining at run-time what functionality is available, and modifying the graphical user interface associated with the application to display controls for the available functions.

A system consistent with the present invention dynamically constructs a graphical user interface associated with an application. A command class library stores command classes that represent additional functions to be integrated with the application. An execution unit attempts to instantiate the command classes at run-time of the application, determines which of the command classes were instantiated successfully, and constructs the graphical user interface such that the graphical user interface contains the additional functions of the successfully instantiated command classes.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention reconfigure the graphical user interface associated with a program based on the additional features determined to be available at run-time. That is, during execution, the program determines which classes are available and then constructs a graphical user interface to reflect all of the available classes. Each class typically represents one feature offered by the program. For example, one class for a mail program may represent a calendar function.

SYSTEM DESCRIPTION

Figure 1:
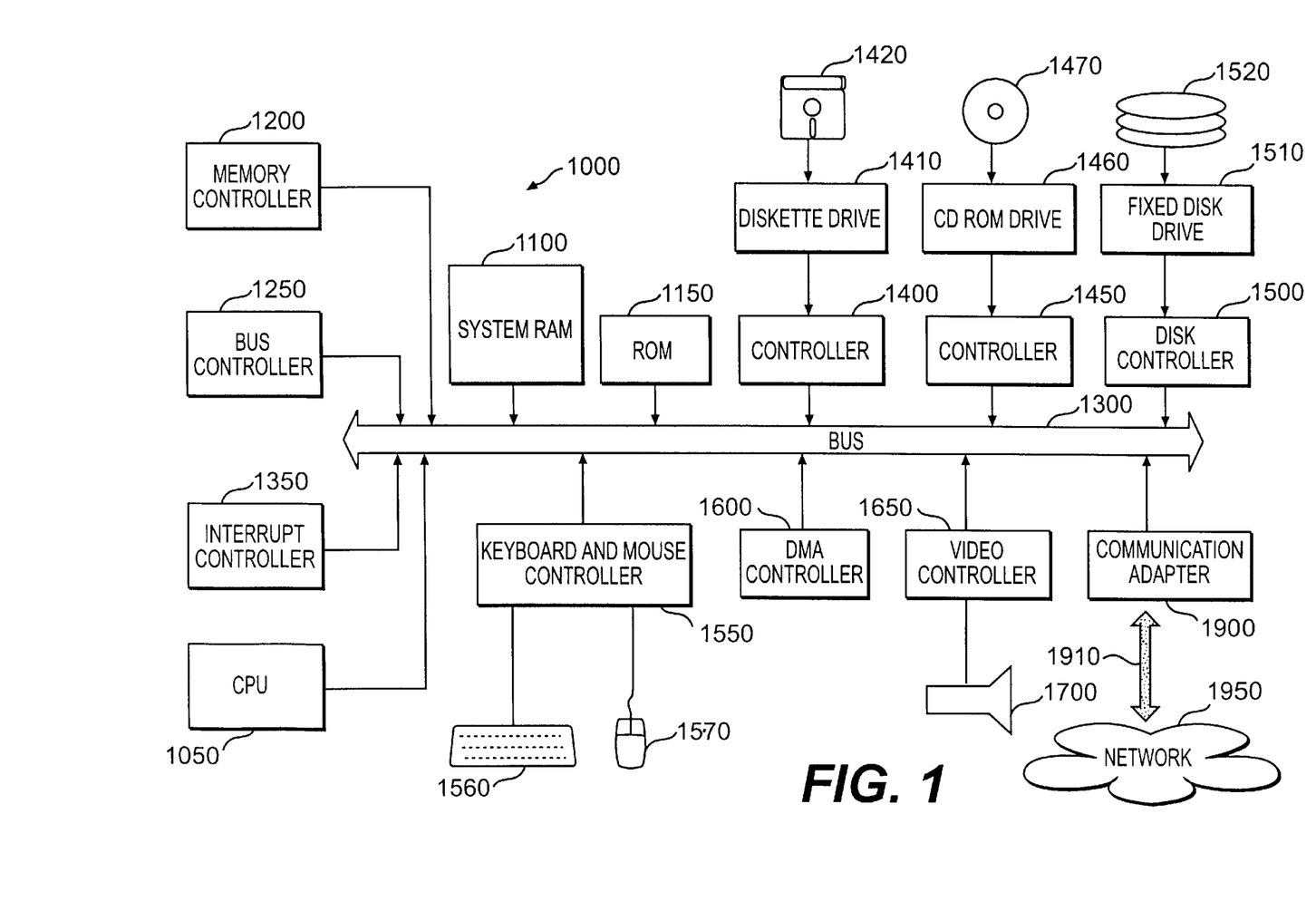
FIG. 1 is a diagram of a computer system consistent with the present invention.

FIG. 1 is a diagram of a system architecture for a computer system with which the invention may be implemented. The exemplary computer system of FIG. 1 is for descriptive purposes only. Although the description may refer to terms commonly used in describing particular computer systems, such as an IBM PS/2 personal computer, the description and concepts equally apply to other computer systems such as network computers, workstations, and even mainframe computers having architectures dissimilar to FIG. 1.

Furthermore, the implementation is described with reference to a computer system implementing the Java programming language, the Java™ runtime environment, and the Java™ Virtual Machine specifications, although the invention is equally applicable to other computer systems having similar requirements. Specifically, the present invention may be implemented with both object-oriented and non-object-oriented programming systems.

Computer system 1000 includes a central processing unit (CPU) 1050, which may be implemented with a conventional microprocessor, a random access memory (RAM) 1100 for temporary storage of information, and a read only memory (ROM) 1150 for permanent storage of information. A memory controller 1200 is provided for controlling RAM 1100.

A bus 1300 interconnects the components of computer system 1000. A bus controller 1250 is provided for controlling bus 1300. An interrupt controller 1350 is used for receiving and processing various interrupt signals from the system components.

Mass storage may be provided by diskette 1420, CD ROM 1470, or hard drive 1520. Data and software may be exchanged with computer system 1000 via removable media such as diskette 1420 and CD ROM 1470. Diskette 1420 is insertable into diskette drive 1410 which is, in turn, connected to bus 1300 by a controller 1400. Similarly, CD ROM 1470 is insertable into CD ROM drive 1460 which is, in turn, connected to bus 1300 by controller 1450. Hard disk 1520 is part of a fixed disk drive 1510 which is connected to bus 1300 by controller 1500.

User input to computer system 1000 may be provided by a number of devices. For example, a keyboard 1560 and mouse 1570 are connected to bus 1300 by controller 1550. It will be obvious to those reasonably skilled in the art that other input devices, such as a pen, a tablet, or speech recognition mechanisms, may be connected to bus 1300 and an appropriate controller and software, as required. DMA controller 1600 is provided for performing direct memory access to RAM 1100. User output may be generated by video controller 1650 which controls video display 1700.

Computer system 1000 also includes a communications adaptor 1900 which allows the system to be interconnected to additional computing resources via a local area network (LAN) or a wide area network (WAN), such as the Internet, schematically illustrated by bus 1910 and network 1950. Signals traveling through network 1950 can generally be referred to as "carrier waves," which transport information. Although aspects of the present invention are described as being stored in memory in the form of instructions, one skilled in the art will appreciate that those aspects may be stored on other computer-readable media, such as secondary storage devices like hard disks, floppy disks, or CD ROM, or other forms of RAM or ROM, or a carrier wave.

Operation of computer system 1000 is generally controlled and coordinated by operating system software. The operating system controls allocation of system resources and performs tasks such as memory management, process scheduling, networking, and services, among other things.

Figure 2:
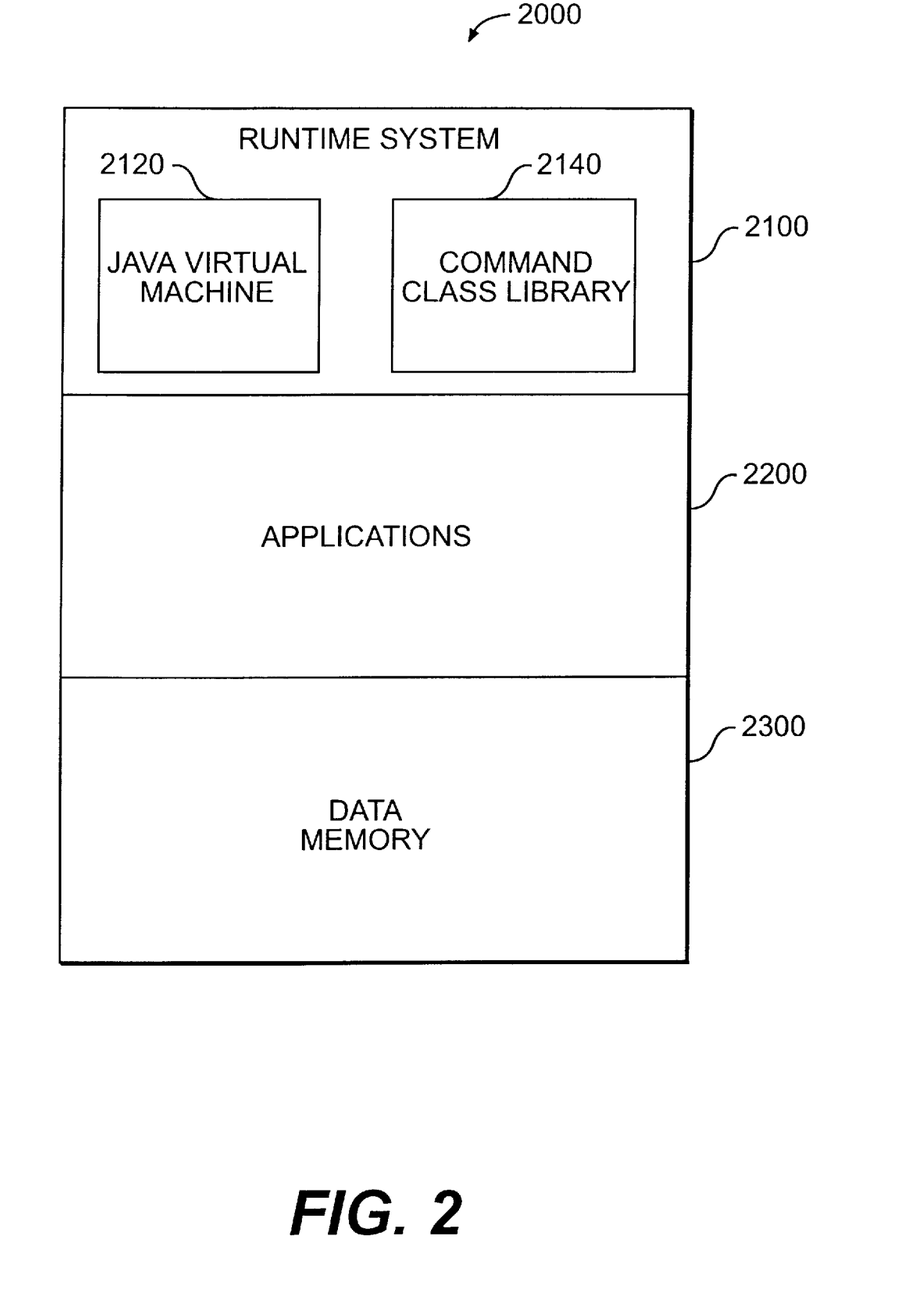
FIG. 2 is a diagram of a memory of FIG. 1 in an implementation consistent with the present invention.

FIG. 2 is a diagram of memory 2000 consistent with the present invention. Memory 2000 may include system RAM 1100 (FIG. 1), but may alternatively include other types of memories including any of the memories shown in FIG. 1.

Memory 2000 includes runtime system 2100, applications 2200, and data memory 2300. At the core of the Java runtime system 2100 is Java Virtual Machine (JVM) 2120. JVM 2120 is a microprocessor implemented in software that runs using the capabilities provided by the operating system and the computer hardware. The JVM is described, for example, in a text entitled "The Java Virtual Machine Specification," by Tim Lindholm and Frank Yellin, Addison Wesley, 1996, which is hereby incorporated by reference. The runtime system 2100 also includes command class library 2140. Command class library 2140 will be described below with reference to FIG. 3.

Applications 2200 include programs executed by CPU 1050 and interpreted by JVM 2120. The programs include object-oriented applets, such as applets in the Java programming language, as well as other object-oriented programs, multiplatform programs, secure programs, distributed networking programs, multithreaded programs, web programs, etc. Some of the programs operate on objects stored in data memory 2300. Data memory 2300 stores data used by CPU 1050 and JVM 2120.

EXEMPLARY COMMAND CLASS LIBRARY

Figure 3:
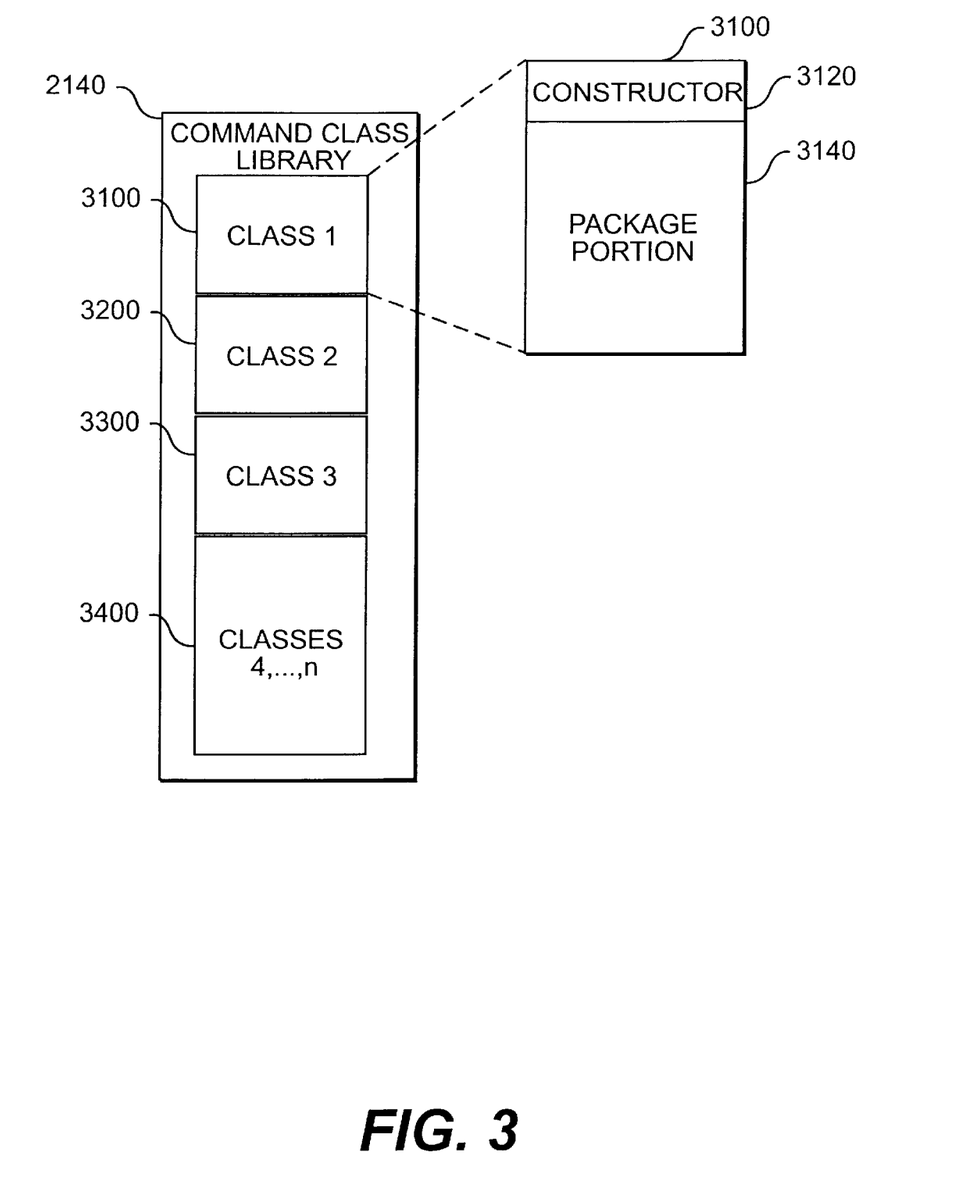
FIG. 3 is a diagram of the command class library of FIG. 2 in an implementation consistent with the present invention.

FIG. 3 is a diagram of command class library 2140. Command class library 2140 stores multiple command classes 3100–3400 that contain, if successfully instantiated, additional functionality for an application. Command class 3100, for example, includes constructor 3120 and package portion 3140. Constructor 3120 records a list of the identities of external packages (or items) upon which command class 3100 depends (i.e., other classes required to perform its functionality). Package portion 3140 contains conventional code of the Java programming language for instantiating these packages.

When invoked by JVM 2120, constructor 3120 attempts to locate any packages (or classes in a package) that it needs for successful instantiation of command class 3100. Constructor 3120 need not instantiate the packages found, it may only determine whether they exist. Package portion 3140 will instantiate the packages at a later time in a conventional manner, as required by the application.

If constructor 3120 fails to locate a package, constructor 3120 throws an Exception. The Exception informs JVM 2120 that instantiation of command class 3100 failed, and, therefore, the features offered by the command class are unavailable to the application user and should not be included in the graphical user interface.

SYSTEM OPERATION

Figure 4A:
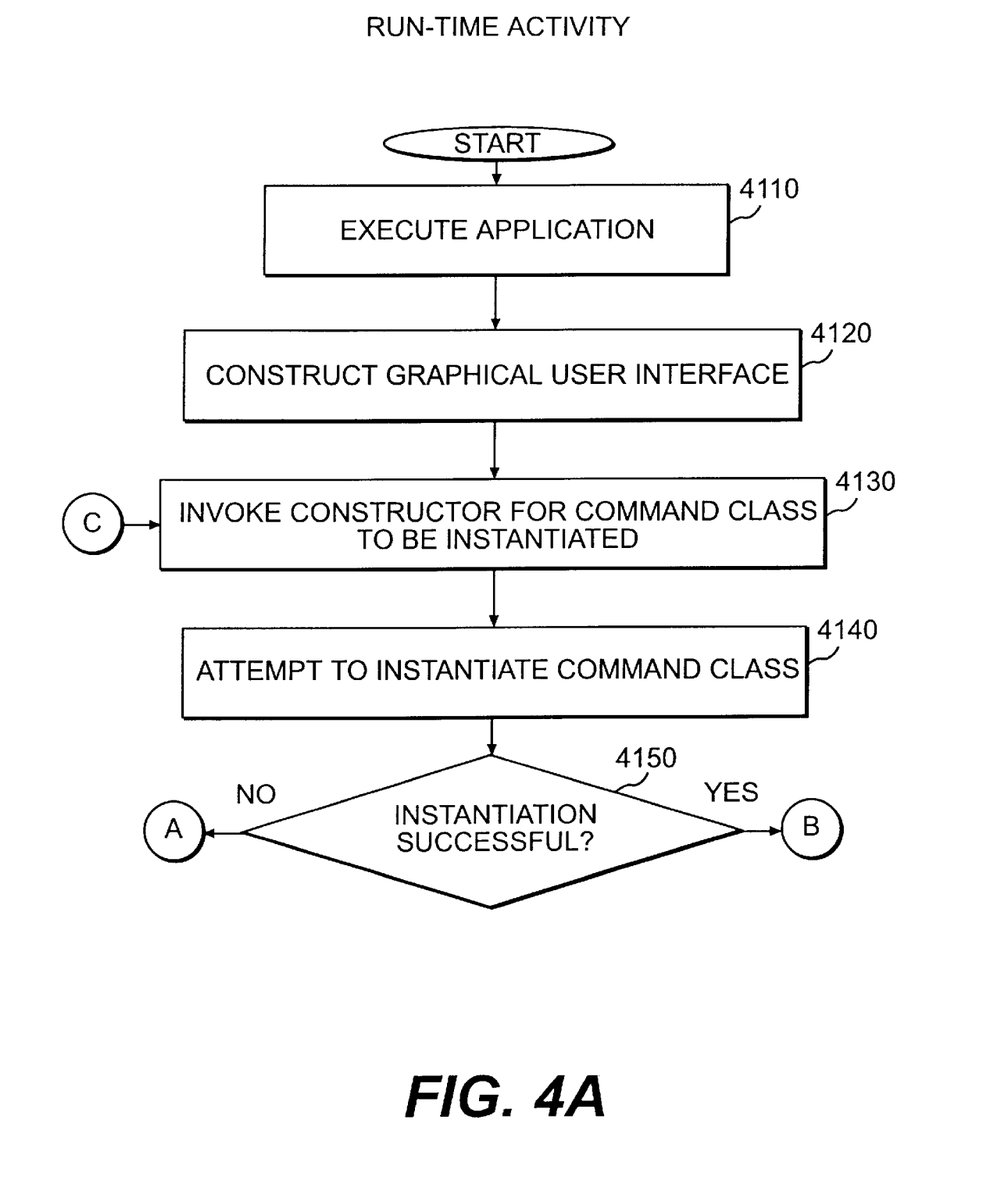
FIGS. 4A, 4B, and 4C are a flowchart of run-time activity consistent with the present invention.
Figure 4B:
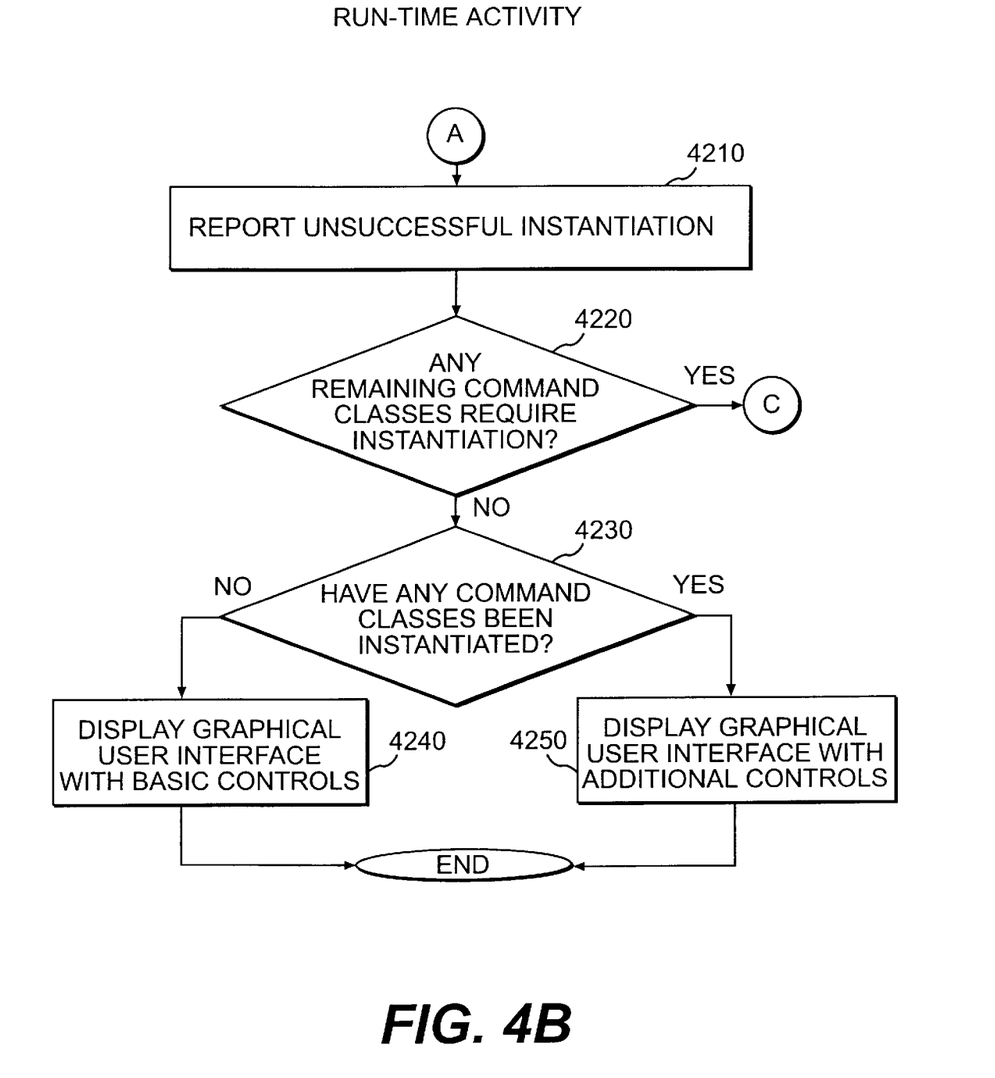
Figure 4C:
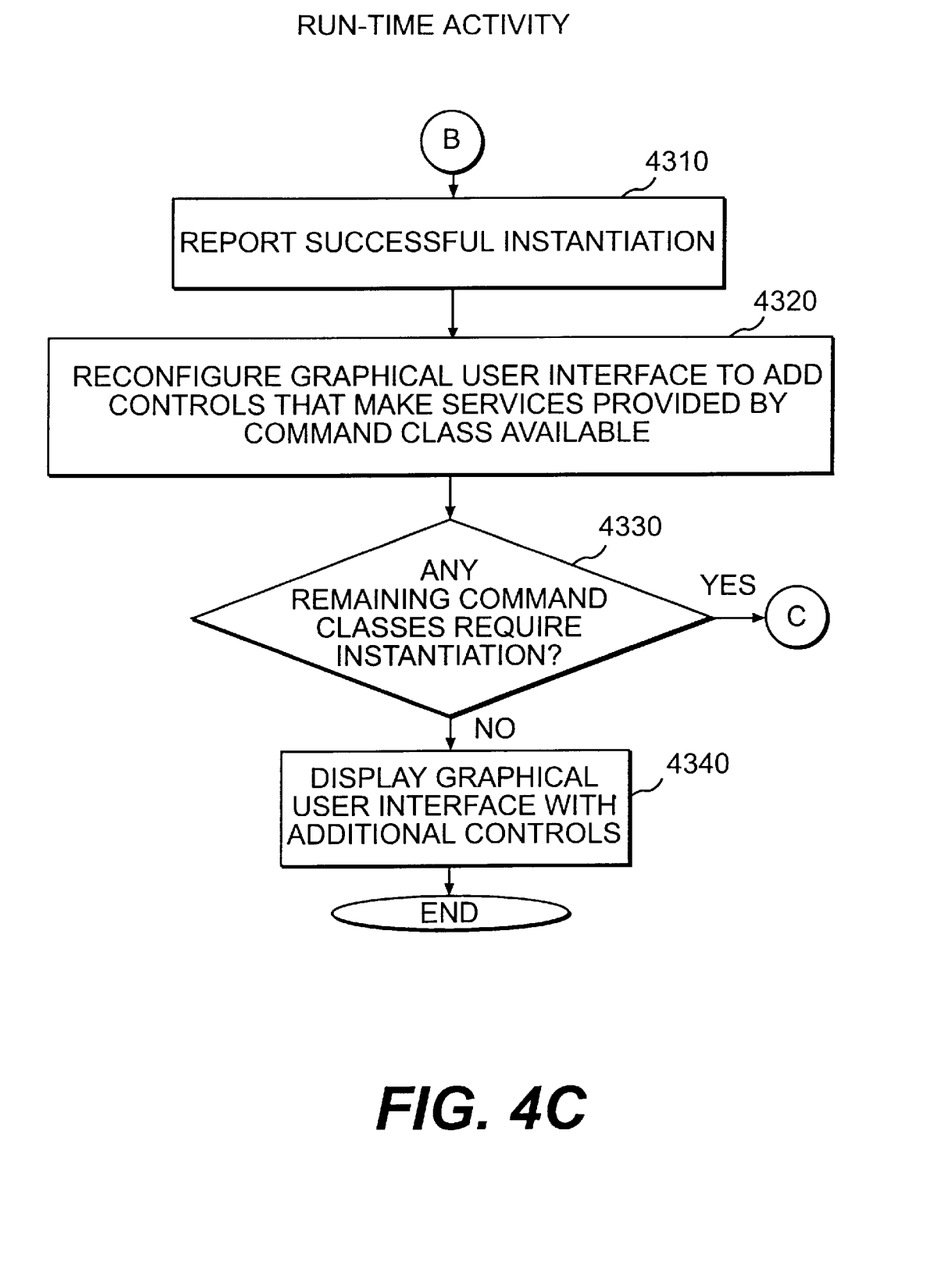
Figure 5A:
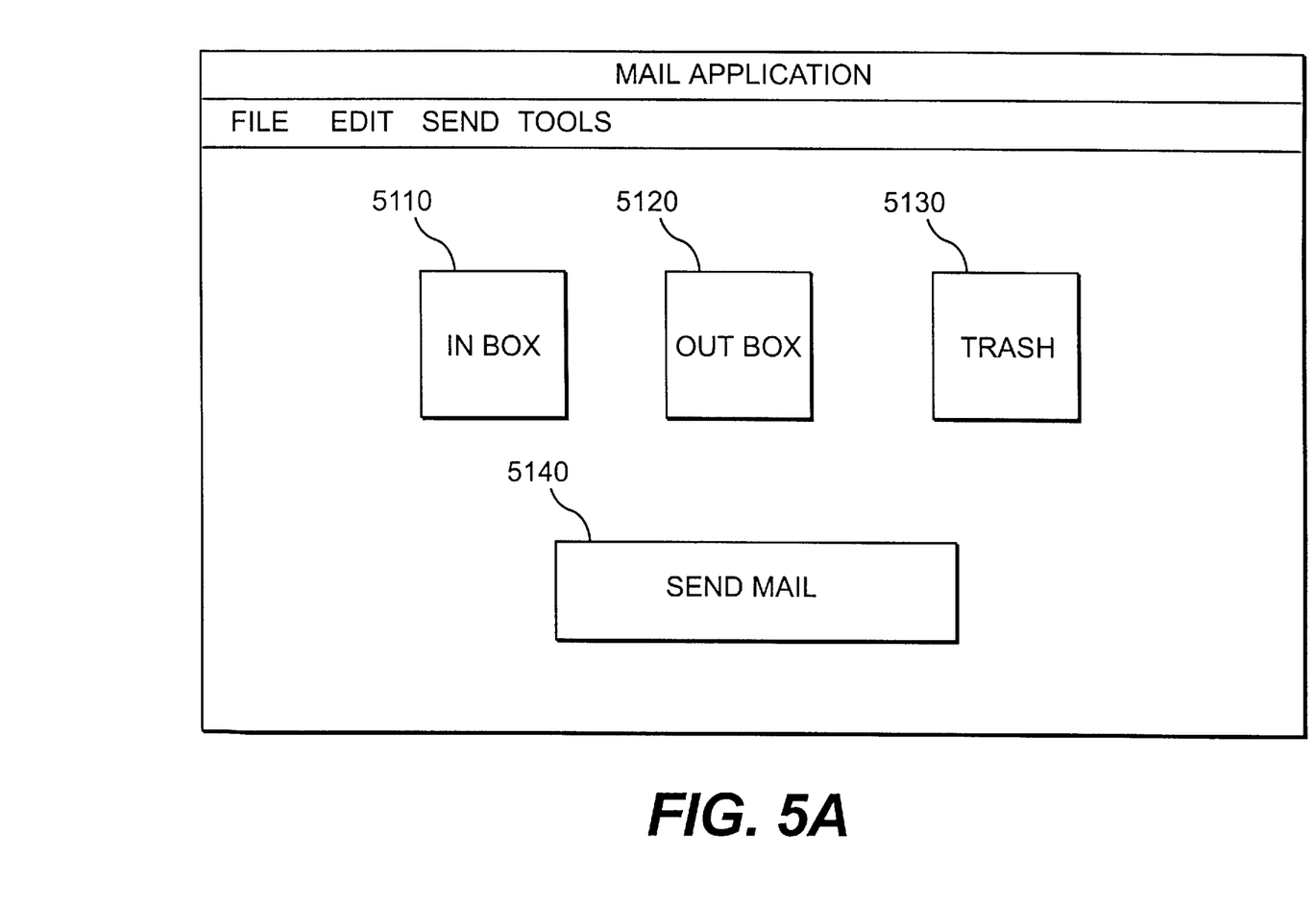
FIGS. 5A, 5B, and 5C illustrate an example of a graphical user interface for a mail application that has been constructed in accordance with the present invention.
Figure 5B:
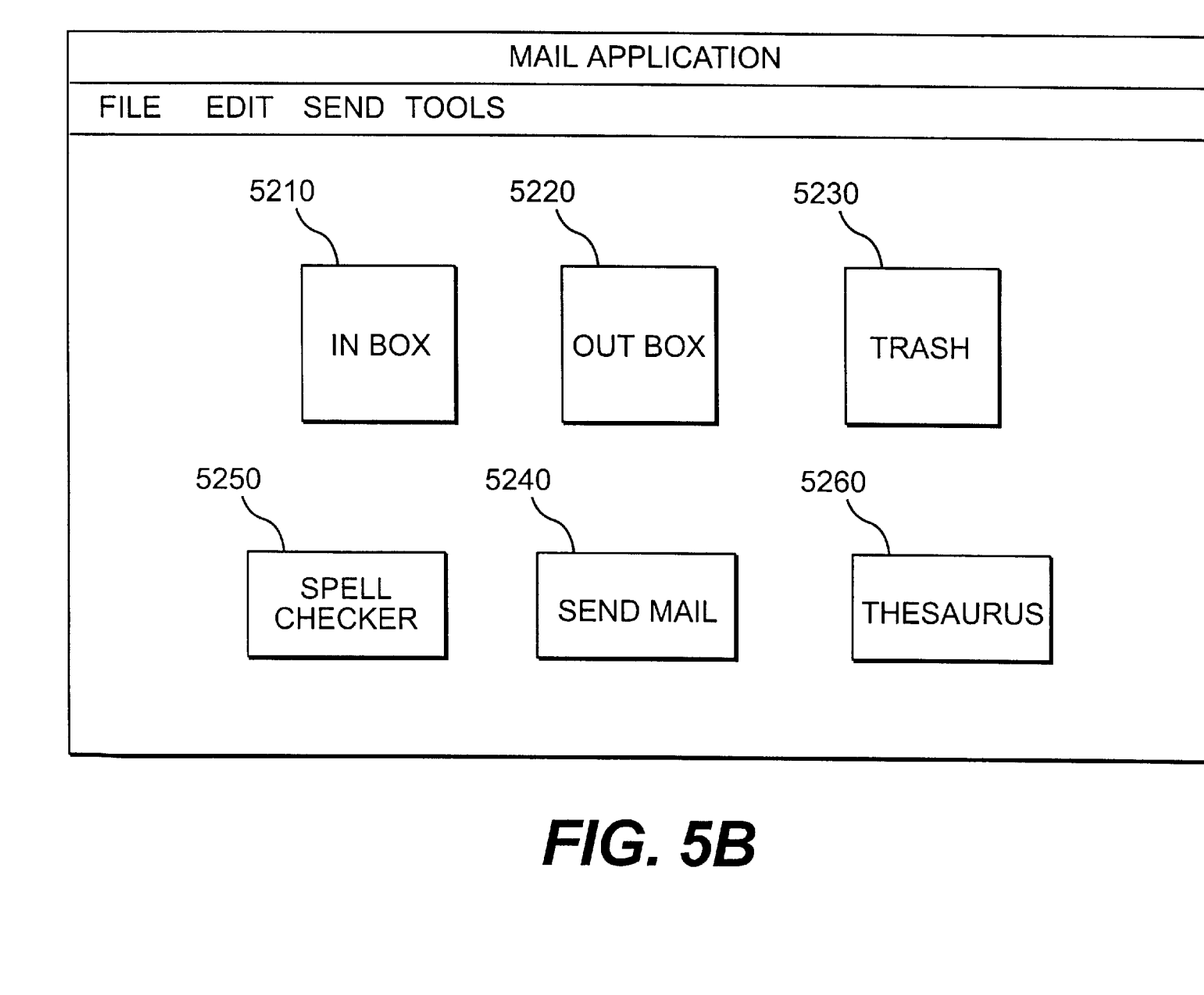
Figure 5C:
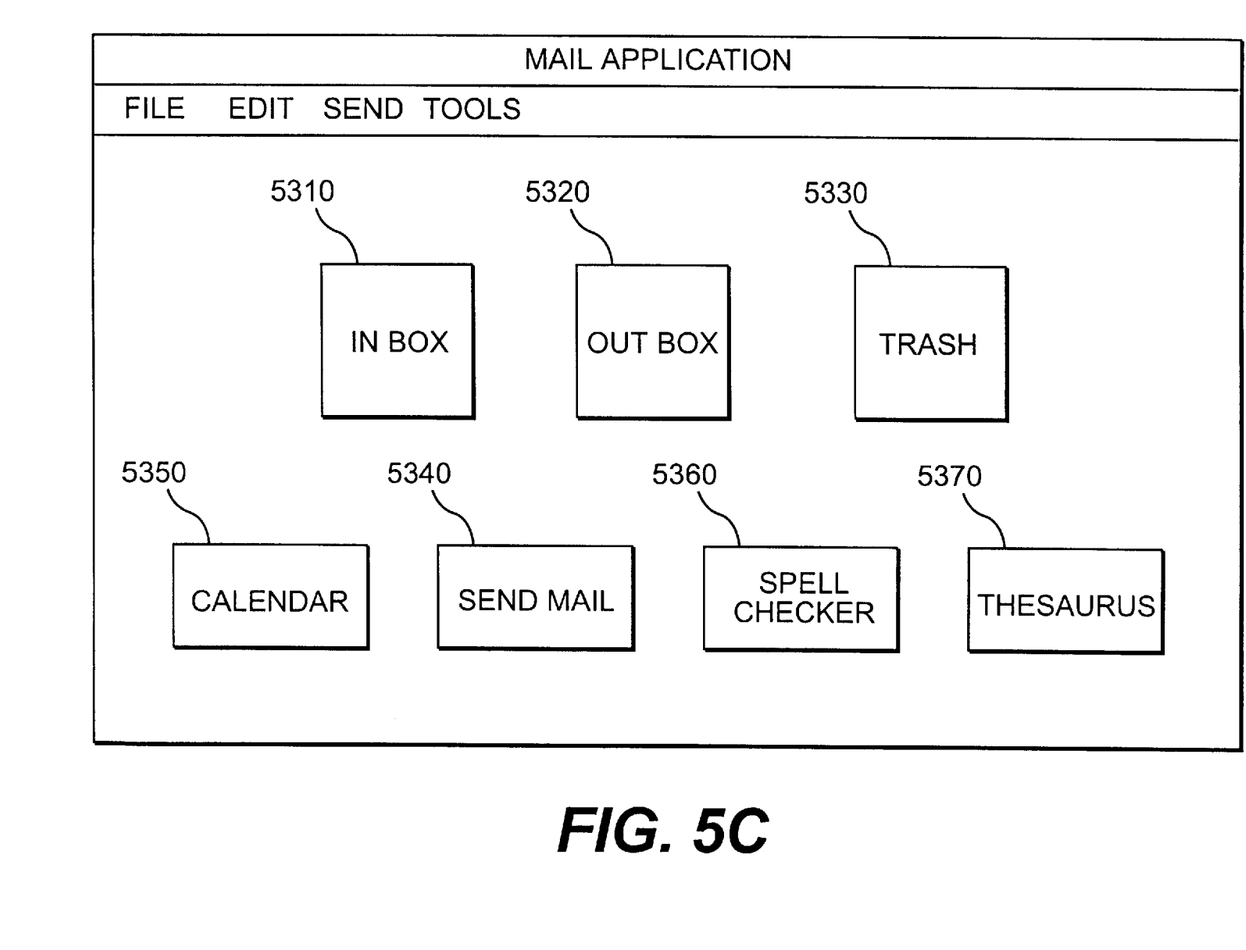

FIGS. 4A–4C are a flowchart of run-time activity consistent with the present invention. FIGS. 5A–5C illustrate an example of a graphical user interface for a mail application that has been constructed in accordance with the present invention.

In executing an object-oriented programming language, such as the Java programming language, JVM 2120 performs many operations, including the execution of applications [step 4110]. While JVM 2120 will be described as performing the application execution, this activity is actually performed by CPU 1050 through the Java runtime system 2100.

At some point during application execution, JVM 2120 will encounter instructions for constructing a graphical user interface that permits a user to interact with the application [step 4120]. Upon encountering these instructions, JVM 2120 accesses command class library 2140 in order to attempt to instantiate the command classes containing the additional functionality available for the application. JVM 2120 invokes constructor 3120, for example, of command class 3100 (FIG. 3), using a "try-catch" clause [step 4130]. The try-catch clause allows the application to attempt to instantiate a command class and still continue to run in the event that an Exception is thrown because the command class could not be instantiated.

Once invoked, constructor 3120 attempts to locate the packages (classes) needed for successful instantiation of command class 3100 from the list constructor 3120 maintains [step 4140]. For each package successfully located, constructor 3120 returns, but discards, a pointer to the package. If a package cannot be located, constructor 3120 throws an Exception, such as:

```
public CalendarCommand throws ClassNotFoundException {
    if (getClass.getResouce("/sunw/calendar/Calendar.class") == null)
        throw new ClassNotFoundException();
}
``` for an unavailable Calendar command class.

If a single required package cannot be located, constructor 3120 declares the instantiation unsuccessful [step 4150] and reports the unsuccessful instantiation in the way of a thrown Exception to JVM 2120 [step 4210] (FIG. 4B). JVM 2120 then determines whether there are any remaining command classes to be instantiated [step 4220]. If one exists, JVM 2120 returns to step 4130 (FIG. 4A) to invoke the constructor for that command class.

If there are no remaining command classes to be instantiated, JVM 2120 determines whether any command class has been successfully instantiated [step 4230]. If no command classes were instantiated, then JVM 2120 displays a basic (or default) graphical user interface on video display 1700 (FIG. 1) with only the basic controls for proper operation of the application [step 4240]. FIG. 5A illustrates an example of a graphical user interface with basic controls for a mail application. The graphical user interface includes four basic controls depicted as buttons: In Box 5110, Out Box 5120, Trash 5130, and Send Mail 5140. These buttons invoke functions well known in the art.

If one or more command classes have been successfully instantiated, however, JVM 2120 displays the graphical user interface on video display 1700 with additional controls relating to the successfully instantiated command classes [step 4250]. FIG. 5B illustrates an example of a graphical user interface with additional controls for a mail application. The graphical user interface includes the four basic controls 5210–5240 and additional controls for a Spell Checker 5250 and a Thesaurus 5260. These buttons invoke functions well known in the art.

If in step 4150 (FIG. 4A) constructor 3120 successfully locates all of the required packages, constructor 3120 declares the instantiation successful, and reports the successful instantiation to JVM 2120 [step 4310] (FIG. 4C). In response, JVM 2120 reconfigures the graphical user interface to add one or more controls for the successfully instantiated command class [step 4320]. As described above, these controls make the services provided by the command class available to the user.

JVM 2120 then determines whether there are any remaining command classes to be instantiated [step 4330]. If one exists, JVM 2120 returns to step 4130 (FIG. 4A) to invoke the constructor for that command class. If there are no remaining command classes to be instantiated, however, JVM 2120 displays the graphical user interface on video display 1700 with additional controls relating to the successfully instantiated command classes [step 4340]. FIG. 5C illustrates an example of a graphical user interface with additional controls for a mail application. The graphical user interface includes the four basic controls 5310–5340 and additional controls for a Calendar 5350, a Spell Checker 5360, and a Thesaurus 5370. These buttons invoke functions well known in the art.

CONCLUSION

Systems and methods consistent with the present invention dynamically determine the form of a graphical user interface associated with an application based on a run-time determination of the available features.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, an implementation consistent with the present invention has been described as beginning with a basic graphical user interface and adding visual controls based on the additional features found available at run-time. However, this need not be the case. The graphical user interface could be initially loaded with all possible controls. Controls would then be removed from the interface based on the run-time determination of available additional features.

In addition, while the foregoing description described the generation of a graphical user interface, the description and concepts equally apply to other types of user interfaces, such as text-based user interfaces.

What is claimed is:

1. A system that dynamically constructs a graphical user interface associated with a program, comprising:
   a command class library to store at least one command class, the command class representing an additional function for use with the program; and
   an execution unit to attempt to instantiate the command class at run-time of the program without updating the program to determine whether the command class was instantiated successfully, and to construct the graphical user interface such that the graphical user interface contains the additional function corresponding to the successfully instantiated command class, wherein the execution unit includes a configuration component to modify the graphical user interface by inserting visual controls for invoking the additional function of the successfully instantiated command class, and to display the modified graphical user interface on a visual display, without user intervention.

2. The system of claim 1, wherein the command class includes:
   a constructor to locate items for successful instantiation of the command class when invoked by the execution unit.

3. The system of claim 2, wherein the constructor includes:
   a notification component that informs the execution unit whether all items were located, and when the constructor fails to locate at least one of the items, that informs the execution unit that the additional function of the command class is unavailable.

4. The system of claim 1, wherein the execution unit includes:
   a reconfiguration component to modify the graphical user interface by adding or removing visual controls for invoking the additional function of the successfully instantiated command class.

5. The system of claim 1, wherein the execution unit includes:
   a display component to display a basic graphical user interface on a visual display when the command class is not successfully instantiated.

6. A computer-implemented method for dynamically constructing a user interface associated with a program, command classes associated with the program representing additional functions for use by the program, comprising the steps of:
   attempting to instantiate the command classes without updating the program;
   determining which of the command classes are instantiated successfully;
   constructing the user interface such that the user interface contains the additional functions corresponding to the successfully instantiated command classes;
   modifying the user interface by inserting visual controls for invoking the additional function of the successfully instantiated command class, without user intervention; and
   displaying the modified graphical user interface on a visual display.

7. The method of claim 6, wherein the attempting step includes the substeps of:
   locating items for successful instantiation of the command classes, and
   declaring an instantiation successful when all of the items are located.

8. The method of claim 7, wherein the declaring substep includes the substep of:
   determining the instantiation unsuccessful when the locating substep fails to locate at least one of the items.

9. The method of claim 6, wherein the constructing step includes the substep of:
   modifying the user interface by adding or removing visual representations for invoking the additional functions of the successfully instantiated command classes.

10. The method of claim 6, wherein the constructing step includes the substep of:
    displaying a basic user interface on a visual display when the attempting step fails to successfully instantiate any of the command classes.

11. A computer program product stored on a computer-readable medium for dynamically constructing a user interface associated with a program, command classes associated with the program representing additional functions for use by the program, comprising:
    an instantiation module to attempt to instantiate the command classes at run-time of the program without updating the program, and to determine which of the command classes were instantiated successfully; and
    a configuration module to construct the user interface such that the user interface contains the additional functions corresponding to the successfully instantiated command classes, wherein the configuration module includes:
    a modification component to modify the user interface by inserting visual representations for invoking the additional functions of the successfully instantiated command classes, without user intervention, and
    a display component to display the modified user interface on a visual display.

12. The computer program product of claim 11, wherein the instantiation module includes:
    a locating component to locate items for successful instantiation of the command classes, and
    a reporting component to declare an instantiation of one of the command classes successful when all of the items for the command class are located.

13. The computer program product of claim 12, wherein the reporting component includes:
    a determination component to declare the instantiation unsuccessful when the locating component fails to locate at least one of the items for the command class.

14. The computer program product of claim 11, wherein the configuration module includes:
    a modification component to modify the user interface by adding or removing visual representations for invoking the additional functions of the successfully instantiated command classes.

15. The computer program product of claim 11, wherein the configuration module includes:
    a display component to display a basic user interface on a visual display when the instantiation module fails to successfully instantiate any of the command classes.

16. A data processing system comprising:
    a memory including
      a program,
      a command class area to store a plurality of command classes that represent additional modules for use with the program, and
      a runtime environment to attempt to instantiate the command classes at run-time of the program without updating the program, to determine which of the command classes were instantiated successfully, and to construct a graphical user interface for the program by adding or removing visual controls for invoking the additional modules of the successfully instantiated command classes; and
    a processor for executing the program and the runtime environment.

17. In a system including a memory containing a command class library storing a plurality of command classes representing additional functions for use with a program, and a runtime environment, the runtime environment comprising:
    an instantiation module configured to attempt to instantiate the command classes during execution of the program, without updating the program, and to determine which of the command classes were instantiated successfully; and
    a configuration module configured to construct a user interface for the program such that the user interface contains the additional functions corresponding to the successfully instantiated command classes, and
    wherein the configuration module includes a modification component to modify the user interface, without user intervention, by inserting visual controls for invoking the additional functions of any successfully instantiated command classes.

18. A method that dynamically constructs a graphical user interface associated with a program, comprising the steps of:

storing a plurality of command classes in a memory, each of the command classes representing a module for use with the program;

executing the program;

attempting to locate items for successful instantiation of the command classes during execution of the program without updating the program;

declaring an instantiation of one of the command classes successful only if all of the items for the command class are located;

constructing the graphical user interface by adding or removing visual controls without user intervention, for invoking the modules associated with the successfully instantiated command classes to or from a basic graphical user interface for the program.

19. A system for dynamically constructing a graphical user interface associated with a program, comprising:

a command class library to store a plurality of command classes, the command classes representing an additional function for use with the program, wherein each command class includes:

a constructor for maintaining a list of required packages that each respective command class requires to perform its associated additional function; and a package portion for instantiating the packages, and an execution unit to attempt to instantiate a predetermined number of command classes from the plurality of command classes, to invoke each constructor in the predetermined number of command classes to attempt to locate any packages needed for successful instantiation of each command class, and to construct a graphical user interface that contains functions corresponding to the program and any successfully instantiated command classes.

20. The system of claim 19, wherein the constructor includes:

an exception component for generating an exception in response to each constructor failing to locate a required package for each respective command class.

21. The system of claim 20, wherein the execution unit includes:

an exception receiving component for receiving each exception generated by the exception component and excluding each respective command class associated with a missing required package from the graphical user interface.

22. A method for dynamically constructing a graphical user interface associated with a program, comprising the steps of storing a plurality of command classes in a memory, each command class representing an additional function for use with the program;

executing the program;

attempting to locate items for successful instantiation of the command classes during execution of the program;

declaring an instantiation of one of the command classes successful only if all of the items for the command class are located;

constructing a default graphical user interface including default program functions in the event none of the command classes are instantiated; and constructing a second graphical user interface including the default program functions and functions corresponding to any successfully instantiated command classes.

23. The method of claim 22, wherein attempting to locate items includes:

generating an exception in the event one or more items could not be located, wherein the program continues to execute after the exception is generated.

24. A data processing system comprising:

a memory including a program, a command class area to store a plurality of command classes that represent additional modules for use with the program, wherein the command class includes a constructor to locate items for successful instantiation of the command class; and a runtime environment to attempt to instantiate the command classes at run-time of the program without updating the program, to determine which of the command classes were instantiated successfully, and to construct a graphical user interface for the program by adding or removing visual controls for invoking the additional modules of the successfully instantiated command classes, without user intervention; and a processor for executing the program and the runtime environment.

* * * * *

UNITED STATES PATENT AND TRADEMARK OFFICE
CERTIFICATE OF CORRECTION

| | |
|---|---|
| PATENT NO. | : 6,208,336 B1 |
| DATED | : March 27, 2001 |
| INVENTOR(S) | : Kapono D. Carter |

It is certified that error appears in the above-identified patent and that said Letters Patent is hereby corrected as shown below:

<u>Column 9, claim 18,</u>
Line 13, after "visual controls", insert a comma.

Signed and Sealed this

Sixteenth Day of October, 2001

Attest:

NICHOLAS P. GODICI
*Attesting Officer* — *Acting Director of the United States Patent and Trademark Office*